(12) United States Patent
Pitio

(10) Patent No.: US 6,973,048 B2
(45) Date of Patent: Dec. 6, 2005

(54) COMPOSITE ADD/DROP MULTIPLEXOR

(75) Inventor: Walter Michael Pitio, Morganville, NJ (US)

(73) Assignee: Bay Microsystems, Inc., San Jose, CA (US)

(*) Notice: Subject to any disclaimer, the term of this patent is extended or adjusted under 35 U.S.C. 154(b) by 835 days.

(21) Appl. No.: 09/973,972

(22) Filed: Oct. 10, 2001

(65) Prior Publication Data

US 2003/0076860 A1    Apr. 24, 2003

(51) Int. Cl.[7] ............................................. H04L 12/28
(52) U.S. Cl. .................... 370/258; 370/386; 370/400; 370/535
(58) Field of Search ................. 370/222, 223, 370/224, 242, 249, 255, 258, 352, 358, 386, 370/391, 400, 406, 535

(56) References Cited

U.S. PATENT DOCUMENTS

| 6,122,249 | A  | * | 9/2000 | Mochizuki et al. | .......... 370/220 |
| 6,876,624 | B1 | * | 4/2005 | Fujita et al. | ................. 370/220 |
| 2002/0089719 | A1 | * | 7/2002 | Joo et al. | ..................... 370/406 |
| 2002/0133698 | A1 | * | 9/2002 | Wank | ......................... 370/222 |
| 2005/0031345 | A1 | * | 2/2005 | Sharma et al. | .............. 370/242 |

* cited by examiner

Primary Examiner—Chi Pham
Assistant Examiner—Anh-Vu H Ly
(74) Attorney, Agent, or Firm—DeMont & Breyer, LLC

(57) ABSTRACT

A telecommunications node architecture is disclosed that comprises multiple add/drop multiplexors that are interconnected in a novel topology to enhance the reliability of the telecommunications network. Furthermore, the architecture of the illustrative embodiment ameliorates the well-known "add-before-drop" problem.

2 Claims, 6 Drawing Sheets

COMPOSITE ADD/DROP MULTIPLEXOR

FIELD OF THE INVENTION

The present invention relates to telecommunications in general, and, more particularly, to an architecture for a composite add/drop multiplexor, which is commonly used in high-speed backbone networks (e.g., SONET/SDH networks, etc.).

BACKGROUND OF THE INVENTION

The first generation of optical fiber systems in the public telephone network used proprietary architectures, equipment line codes, multiplexing formats, and maintenance procedures. This diversity complicated the task of the Regional Bell Operating Companies and the interexchange carriers who needed to interface their equipment with these diverse systems.

To ease this task, Bellcore initiated an effort to establish a standard for connecting one optical fiber system to another. That standard is officially named the Synchronous Optical Network, but it is more commonly called "SONET." The international version of the standard is officially named the Synchronous Digital Hierarchy, but it is more commonly called "SDH."

Although differences exist between SONET and SDH, those differences are mostly in terminology. In virtually all practical aspects, the two standards are operationally compatible, and, therefore, virtually all of the equipment that complies with either the SONET standard or the SDH standard also complies with the other. For the purposes of this specification, the combined acronym/initialism "SONET/SDH" is defined as the Synchronous Optical Network or the Synchronous Digital Hierarchy or both the Synchronous Optical Network and the Synchronous Digital Hierarchy.

SUMMARY OF THE INVENTION

The present invention is a telecommunications node architecture that avoids some of the costs and disadvantages associated with node architectures in the prior art. For example, the illustrative embodiment comprises a plurality of add/drop multiplexors that are interconnected in a novel topology to enhance the reliability of the telecommunications network. Furthermore, the architecture of the illustrative embodiment ameliorates the well-known "add-before-drop" problem.

The illustrative embodiment comprises:

a) a first add/drop multiplexor comprising: a first input for receiving a first signal from a first node, a first output for transmitting a second signal to a second node, a second input for receiving a third signal from a first output of a second add/drop multiplexor, and a second output for transmitting a fourth signal to a first input of the second add/drop multiplexor; and b) the second add/drop multiplexor comprising: the first input for receiving the fourth signal from the second output of the first add/drop multiplexor, the first output for transmitting the third signal to the second input of the first add/drop multiplexor, a second input for receiving a fifth signal from the second node, and a second output for transmitting a sixth signal to the first node.

DETAILED DESCRIPTION

Figure 1:
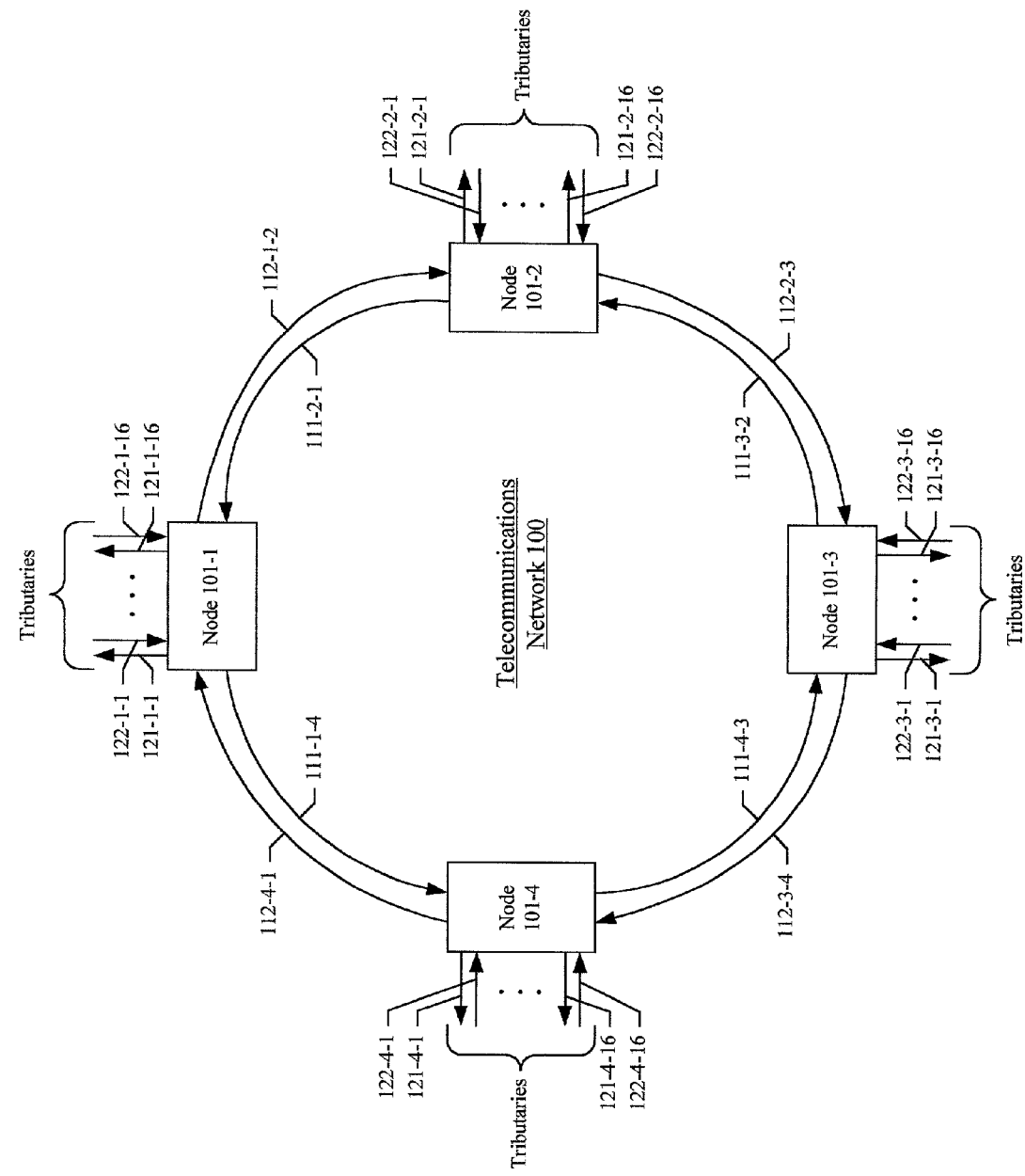
FIG. 1 depicts a block diagram of the illustrative embodiment of the present invention.

FIG. 1 depicts a block diagram of the first illustrative embodiment of the present invention, telecommunications network 100, which is a SONET/SDH ring network operating as a bi-directional line switched ring ("BLSR"). In accordance with the illustrative embodiment, telecommunications network 100 comprises four nodes, nodes 101-1 through 101-4, that are interconnected by two sets of optical fibers, each of which carries an OC-768. Therefore, each node comprises two OC-768 line inputs and two OC-768 line outputs.

Although the illustrative embodiment uses the SONET/SDH protocol, it will be clear to those skilled in the art how to make and use embodiments of the present invention that use other protocols. Although the illustrative embodiment is a ring network, it will be clear to those skilled in the art how to make and use embodiments of the present invention in which some or all of the nodes are interconnected in a mesh topology or non-ring network. Although the illustrative embodiment operates as a bi-directional line switched ring, it will be clear to those skilled in the art how to make and use embodiments of the present invention that operate in a different fashion (e.g., as a unidirectional path switched ring, as a four-fiber ring, etc.). Although the illustrative embodiment comprises four nodes, it will be clear to those skilled in the art how to make and use embodiments of the present invention that comprise a different number of nodes. Although the illustrative embodiment carries OC-768 SONET/SDH frames, it will be clear to those skilled in the art how to make and use embodiments of the present invention that carry other SONET/SDH frames.

As shown in FIG. 1, node 101-$i$, for i=1 to 4, is capable of receiving 16 OC-192 tributaries, 122-$i$-1 through 122-$i$-16, and of spawning 16 OC-192 tributaries, 121-$i$-1 through 121-$i$-16. Although each node in the illustrative embodiment comprises the same number of tributaries, it will be clear to those skilled in the art how to make and use embodiments of the present invention in which some or all of the nodes have a different number of tributaries. Although each tributary operates at an OC-192 data rate, it will be clear to those skilled in the art how to make and use embodiments of the present invention in which some of the tributaries have a different data rate (e.g., OC-48, OC-12, OC-3, etc.).

In accordance with the illustrative embodiment of the present invention, node 101-$i$ is capable of functioning as an add/drop multiplexor and i. a switch, or ii. a time-slot interchanger, or iii. both i and ii.

In functioning as an add/drop multiplexor, node 101-*i* is capable of:

i. adding an STS-1 from any tributary to one or more lines, or ii. dropping an STS-1 from a line to one or more tributaries, or iii. both i and ii.

In functioning as a switch, node 101-*i* is capable of routing any STS-1 from any line or tributary to:

i. one or more lines, or ii. one or more tributaries, iii. both i and ii.

Because node 101-*i* is capable of receiving a signal from one tributary and switching or copying it onto another tributary, and because this is an important aspect of the illustrative embodiment, it is given the name "hairpinning." For the purposes of this specification, the term "hairpinning" is defined as the receipt by a node of a signal on one tributary and the outputting of the signal onto another tributary.

In functioning as a time-slot interchanger, node 101-*i* is capable of moving or copying any STS-1 from any time slot in any line or tributary to one or more other time slots.

Figure 2:
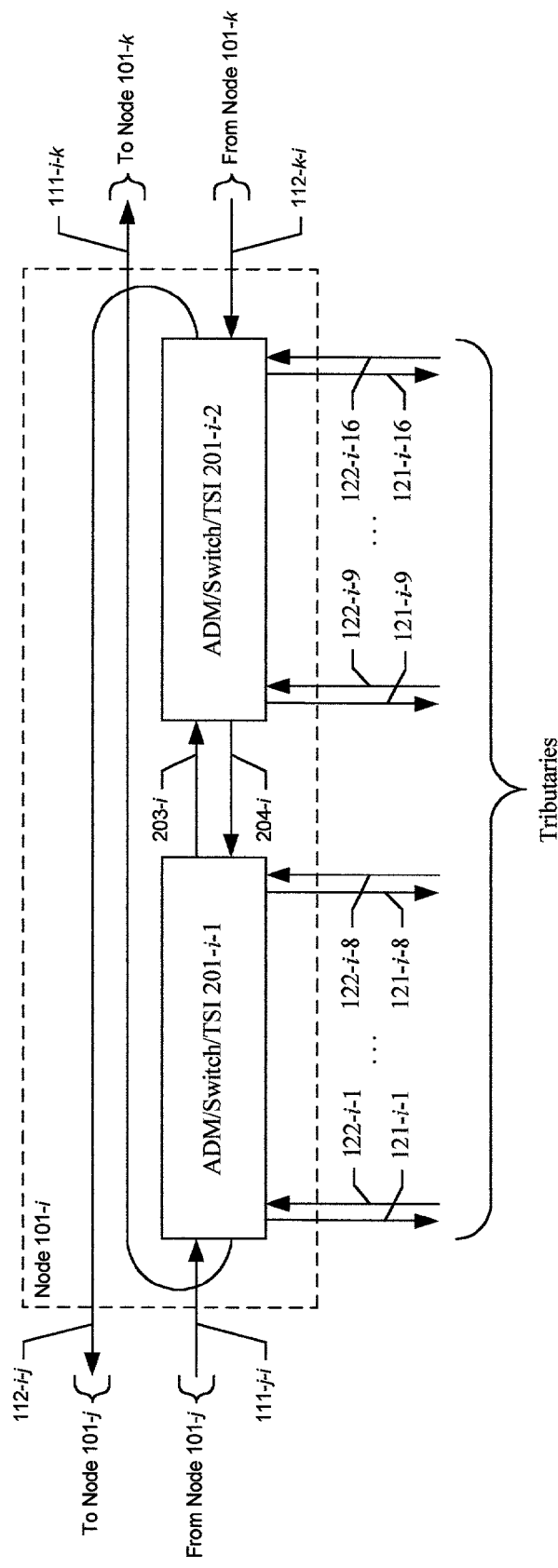
FIG. 2 depicts a block diagram of the salient components of node 101-$i$, as shown in FIG. 1.

FIG. 2 depicts a block diagram of the salient components of node 101-*i*, which receives:

1. an OC-768 SONET/SDH signal from node 101-*j*, 2. an OC-768 SONET/SDH signal from node 101-*k*; and transmits:

1. an OC-768 SONET/SDH signal to node 101-*j*, and 2. an OC-768 SONET/SDH signal to node 101-*k*;

where k=4 and j=2 when i=1; k=1 and j=3 when i=2; k=2 and j=4 when i=3; and k=3 and j=1 when i=4.

Node 101-*i* comprises: add/drop multiplexor/switch/time slot interchanger (hereinafter "ADM/Switch/TSI") 201-*i*-1 and ADM/Switch/TSI 201-*i*-1, interconnected as shown.

Figure 3:
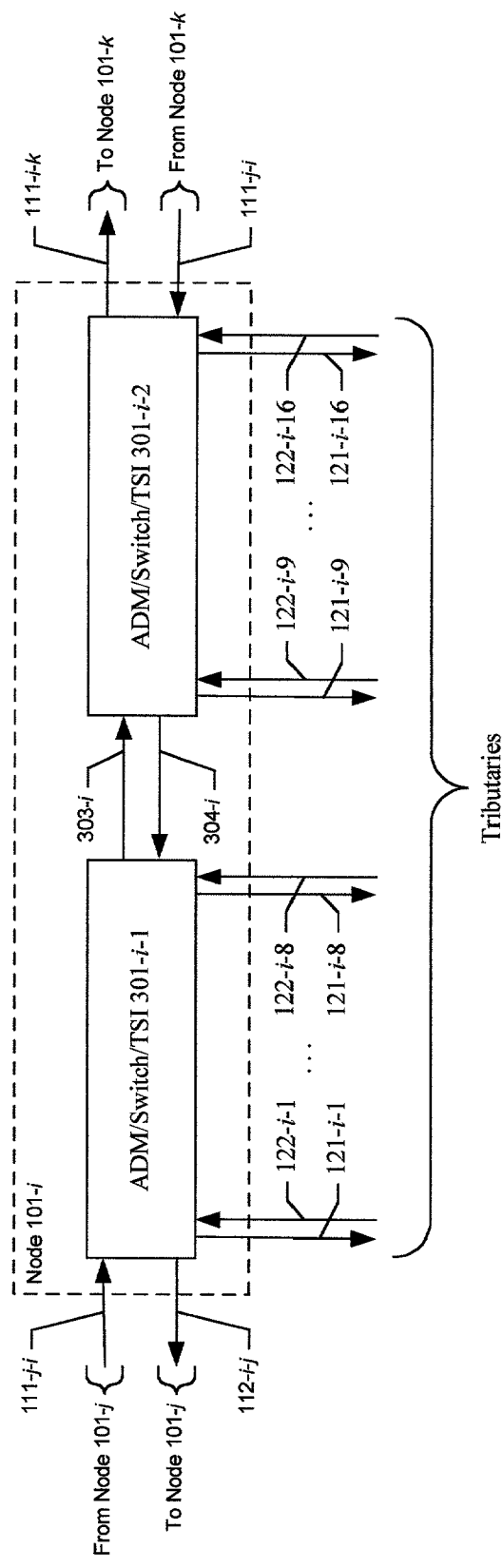
FIG. 3 depicts a block diagram of the salient components of a composite add/drop multiplexor in the prior art.

A salient characteristic of the illustrative embodiment is that line 111-*j*-*i* (i.e., the OC-768 from Node 101-*j*) is fed into one of the line inputs of ADM/Switch/TSI 201-*i*-1 and line 111-*i*-*k* (i.e., the OC-768 to Node 101-*k*) emanates from one of the line outputs of ADM/Switch/TSI 201-*i*-1. Analogously, line 112-*k*-*i* (i.e., the OC-768 from Node 101-*k*) is fed into one of the line inputs of ADM/Switch/TSI 201-*i*-2 and line 112-*i*-*j* (i.e., the OC-768 to Node 101-*j*) emanates from one of the line outputs of ADM/Switch/TSI 201-*i*-2. In other words, line 111 only goes through ADM/Switch/TSI 201-*i*-1 and line 112 only goes through ADM/Switch/TSI 201-*i*-2. This is in noted contrast to composite add/drop multiplexors in the prior art (and as shown in FIG. 3) in which both lines go through both constituent add/drop multiplexors. The advantages of the illustrative embodiment over the prior art are described below.

In node 101-*i*, line 203-*i* is an OC-768 from ADM/Switch/TSI 201-*i*-1 to ADM/Switch/TSI 201-*i*-2 and line 204-*i* is an OC-768 from ADM/Switch/TSI 201-*i*-2 to ADM/Switch/TSI 201-*i*-1.

ADM/Switch/TSI 201-*i*-1 receives eight OC-192 tributaries, 220-1 through 220-8, and spawns eight OC-192 tributaries, 221-1 through 221-8. ADM/Switch/TSI 201-*i*-2 receives eight OC-192 tributaries, 220-9 through 220-16, and spawns eight OC-192 tributaries, 221-9 through 221-16.

The illustrative embodiment is advantageous over the prior art in two principal respects. First, if either constituent add/drop multiplexor in the prior art node fails, the traffic on both rings is affected. In contrast, if either constituent add/drop multiplexor in the illustrative embodiment fails, only the traffic on one ring is affected. From a fault-tolerance perspective, this is highly advantageous.

Second, because the through traffic on each ring does not go through both ADM/Switch/TSI 201-*i*-1 and ADM/Switch/TSI 201-*i*-2, lines 203-*i* and 204-*i* need not carry through traffic, and, therefore, their bandwidth can be used for better purposes.

For example, the bandwidth on lines 203-*i* and 204-*i* can be used is to ameliorate the well-known "add-before-drop" problem. In a non-composite or holistic add/drop multiplexor, the bandwidth recovered from dropping a tributary is immediately available for consumption by a received tributary and there is no add-before-drop problem. In contrast, in a composite add/drop multiplexor, such as that depicted in FIG. 3, the addition and dropping of tributaries must be carefully coordinated because it might not be possible to add a tributary before another is dropped.

For example, there is not enough bandwidth on line 203-*i*, as shown in FIG. 3, to carry a fully-provisioned OC-768 from Node 101-*j* and an STS-1 from tributary 122-*i*-1 even if an STS-1 was being dropped out onto tributary 121-*i*-9. In contrast and in accordance with the illustrative embodiment, line 203-*i* need carry nothing and line 203-*i* need only carry the tributary that is being dropped out onto tributary 121-*i*-9.

A second purpose for which the spare bandwidth on lines 203-*i* and 204-*i* can be used is to facilitate hairpinning between ADM/Switch/TSI 201-*i*-1 and ADM/Switch/TSI 201-*i*-2. In other words, a tributary can be received at ADM/Switch/TSI 201-*i*-1, switched to ADM/Switch/TSI 201-*i*-2 via line 203-*i*, and dropped via ADM/Switch/TSI 201-*i*-2. Analogously, a tributary can be received at ADM/Switch/TSI 201-*i*-2, switched to ADM/Switch/TSI 201-*i*-1 via line 204-*i*, and dropped via ADM/Switch/TSI 201-*i*-1.

A third purpose for which the bandwidth on lines 203-*i* and 204-*i* can be used is to facilitate inter-ring traffic. For example, an STS-1 on ring 111 that needs to be switched to ring 112 by Node 101-*i* needs to be carried by line 203-*i*. Analogously, an STS-1 on ring 112 that needs to be switched to ring 111 by Node 101-*i* needs to be carried by line 204-*i*.

Figure 4:
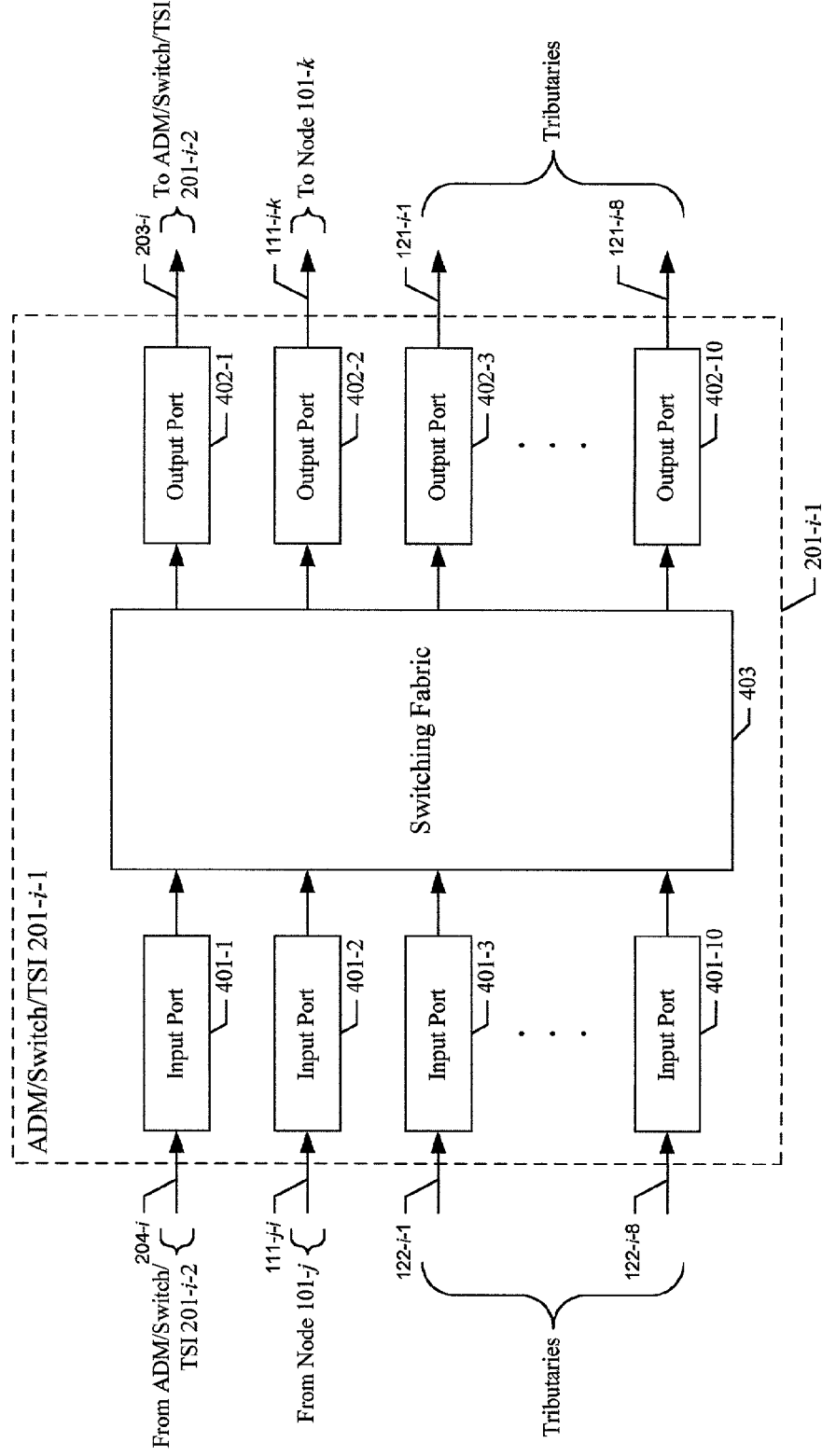
FIG. 4 depicts a block diagram of ADM/Switch/TSI 201-$i$-1, as shown in FIG. 1.

FIG. 4 depicts a block diagram of ADM/Switch/TSI 201-*i*-1, which comprises ten input ports, input ports 401-1 through 401-10, ten output ports, output ports 402-1 through 402-10, and switching fabric 403. Input ports 401-1 and 401-2 receive an OC-768 and input ports 401-3 through 401-10 receive an OC-192 signal. Output ports 402-1 and 402-2 output an OC-768 and output ports 402-3 through 402-10 output an OC-192 signal.

Input ports 401-1 through 401-10 frame synchronize all of the incoming signals so that any STS-1 on any line or tributary and in any time slot can be moved (or copied) into one or more time slots of:

i. one or more lines, or ii. one or more tributaries, or iii. both i and ii.

It will be clear to those skilled in the art how to make and use ADM/Switch/TSI 201-*i*-1.

Figure 5:
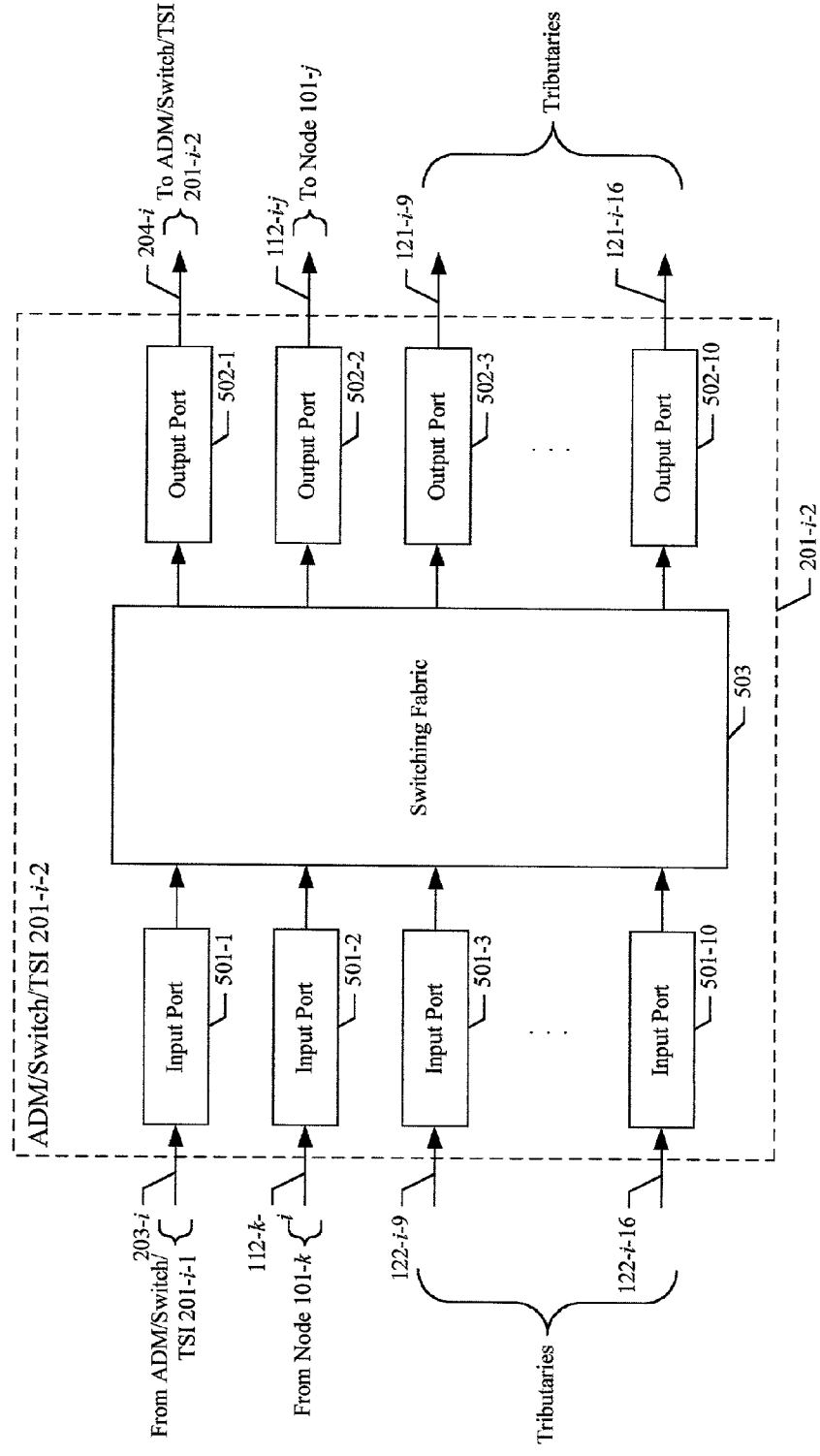
FIG. 5 depicts a block diagram of ADM/Switch/TSI 201-$i$-2, as shown in FIG. 1.

FIG. 5 depicts a block diagram of ADM/Switch/TSI 201-*i*-2, which comprises ten input ports, input ports 501-1 through 501-10, ten output ports, output ports 502-1 through 502-10, and switching fabric 503. Input ports 501-1 and 501-2 receive an OC-768 and input ports 501-3 through 501-10 receive an OC-192 signal. Output ports 502-1 and 502-2 output an OC-768 and output ports 502-3 through 502-10 output an OC-192 signal.

Input ports 501-1 through 501-10 frame synchronize all of the incoming signals so that any STS-1 on any line or tributary and in any time slot can be moved (or copied) into one or more time slots of:
  i. one or more lines, or
  ii. one or more tributaries, or
  iii. both i and ii.

ADM/Switch/TSI 201-*i*-2 advantageously comprises the identical hardware to ADM/Switch/TSI 201-*i*-1.

Figure 6:
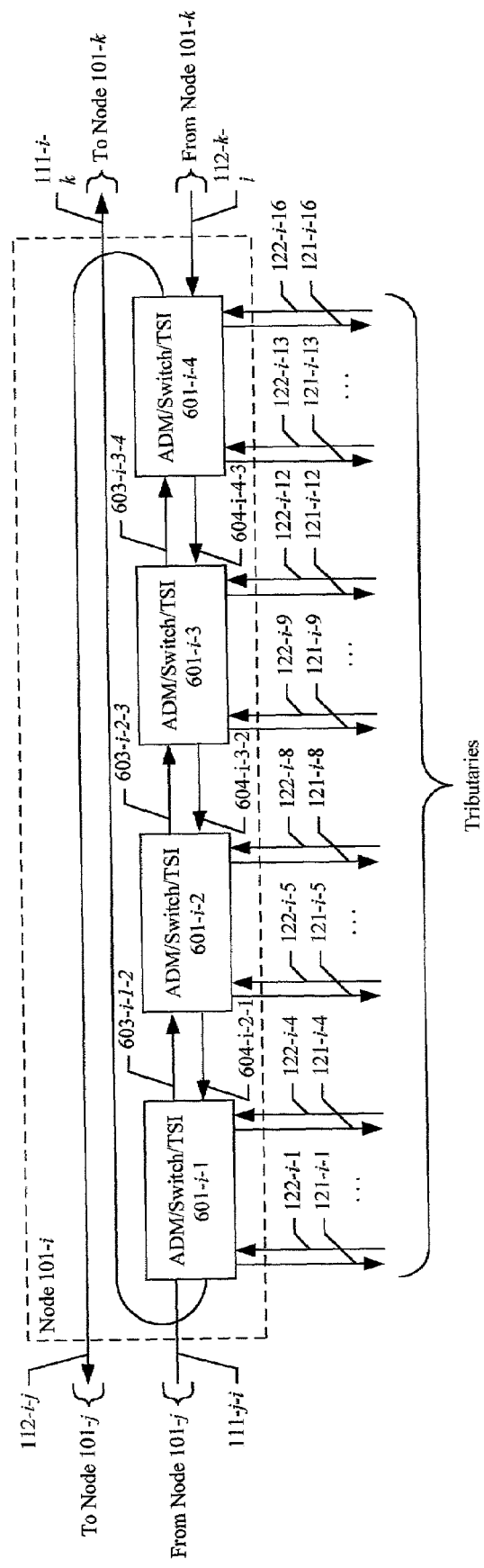
FIG. 6 depicts a block diagram of a variation of the illustrative embodiment of the present invention.

FIG. 6 depicts a block diagram of a variation of the illustrative embodiment of the present invention, in which Node 101-*i* comprises four smaller add/drop multiplexors in contrast to the two larger add/drop multiplexors of the first illustrative embodiment. In the second illustrative embodiment, ADM/Switch/TSI 601-*i*-*x*, for x=1 to 4, receives two OC-768 lines and transmits two OC-768 lines and receives four OC-192 tributaries and spawns four OC-192 tributaries. In this embodiment, like the first embodiment, the bandwidth on lines 603-*i*-1-2, 603-*i*-2-3, 603-*i*-3-4, 604-*i*-1-2, 604-*i*-2-3, and 604-*i*-3-4 is not consumed by ring through traffic but is used for inter-ring traffic, inter-constituent add/drop multiplexor hairpinning, and tributary management.

It is to be understood that the above-described embodiments are merely illustrative of the present invention and that many variations of the above-described embodiments can be devised by those skilled in the art without departing from the scope of the invention. It is therefore intended that such variations be included within the scope of the following claims and their equivalents.

What is claimed is:

1. An apparatus comprising:
   a) a first add/drop multiplexor comprising:
      i) a first input for receiving a first signal from a first node,
      ii) a first output for transmitting a second signal to a second node,
      iii) a second input for receiving a third signal from a first output of a second add/drop multiplexor, and
      iv) a second output for transmitting a fourth signal to a first input of said second add/drop multiplexor; and
   b) said second add/drop multiplexor comprising:
      i) said first input for receiving said fourth signal from said second output of said first add/drop multiplexor,
      ii) said first output for transmitting said third signal to said second input of said first add/drop multiplexor,
      iii) a second input for receiving a fifth signal from said second node, and
      iv) a second output for transmitting a sixth signal to said first node.

2. The apparatus of claim 1 wherein said first node is a SONET/SDH node and said first signal is a series of SONET/SDH frames.

* * * * *